United States Patent [19]
Bickford et al.

[11] 4,083,009
[45] Apr. 4, 1978

[54] HIGH RELIABILITY DIVERSITY COMMUNICATIONS SYSTEM

[75] Inventors: William J. Bickford, Weston; William L. Hatton, Wellesley Hills; Colin J. Pallemaerts, Dover; Paul J. Tanzi, Wayland; Carson K. H. Tsao, Middlesex, all of Mass.

[73] Assignee: Raytheon Company, Lexington, Mass.

[21] Appl. No.: 693,251

[22] Filed: Jun. 4, 1976

Related U.S. Application Data

[63] Continuation of Ser. No. 483,756, Jun. 27, 1974, abandoned.

[51] Int. Cl.² .................... H04B 1/06; H04B 7/02
[52] U.S. Cl. .................................. 325/304; 325/56
[58] Field of Search ................ 325/56, 61, 301–306; 178/67

[56] References Cited
U.S. PATENT DOCUMENTS
3,213,370   10/1965   Featherston .................. 325/304

*Primary Examiner*—Richard Murray
*Attorney, Agent, or Firm*—John R. Inge; Milton D. Bartlett; Joseph D. Pannone

[57] ABSTRACT

An improved reliability microwave communications system combining discrete state modulation with diversity transmission and reception. Signals are transmitted and received in both horizontal and vertical antenna polarization using QPSK modulation techniques in the preferred embodiment. At the receiving terminal the received signal with the best quality as determined by predetermined receiver parameters is selected as the output data stream. Switching between received signals is accomplished using a hitless switch such that no data is lost when switching between received data streams. Redundant switching and transmitting circuitry may also be provided to further increase the reliability of the system.

17 Claims, 24 Drawing Figures

| RECEIVER NO.1 FAULTY | RECEIVER NO. 2 FAULTY | RECEIVER NO.1 BER WORSE THAN $10^{-4}$ | RECEIVER NO. 2 BER WORSE THAN $10^{-4}$ | DELAY DIFFERENCE MORE THAN 1/2 BIT | RECEIVER NO.1 SIGNAL LESS THAN RECEIVER NO. 2 | RECEIVER NO. 2 SIGNAL LESS THAN RECEIVER NO.1 | SWITCH ACTION |
|---|---|---|---|---|---|---|---|
| − | − | − | − | − | − | − | SWITCH REMAINS SAME |
| 1 | − | × | × | × | × | × | RECEIVER NO. 2 ON-LINE |
| − | 1 | × | × | × | × | × | RECEIVER NO.1 ON-LINE |
| 1 | 1 | × | × | × | × | × | SWITCHING REMAINS SAME DATA OUTPUT INHIBITED |
| − | − | 1 | − | × | × | × | RECEIVER NO. 2 ON-LINE |
| − | − | − | 1 | × | × | × | RECEIVER NO.1 ON LINE |
| − | − | 1 | 1 | × | 1 | − | RECEIVER NO. 2 ON-LINE |
| − | − | 1 | 1 | × | − | 1 | RECEIVER NO.1 ON-LINE |
| − | − | 1 | 1 | 1 | × | × | SWITCH REMAINS SAME |
| − | − | − | − | 1 | × | × | SWITCH ACTION INHIBITED |
| − | − | − | − | − | 1 | − | RECEIVER NO. 2 ON-LINE |
| − | − | − | − | − | − | 1 | RECEIVER NO.1 ON-LINE |

FIG. 12

HIGH RELIABILITY DIVERSITY COMMUNICATIONS SYSTEM

CROSS-REFERENCE TO RELATED CASES

This is a continuation of application Ser. No. 483,756, filed June 27, 1974, now abandoned.

BACKGROUND OF THE INVENTION

The invention relates primarily to microwave communication systems wherein data is communicated from point to point over a plurality of channels at microwave frequencies. Such communications systems are frequently used to send computer data from one computer terminal or center to another as well as for other digitized data and video and audio signals. Many channels are customarily provided within the same microwave link. Both digital and analog modulation techniques have been used in prior art systems, digital being the more reliable of the two and presently being almost exclusively used for communications between computer terminals.

QPSK (quaternary phase shift keying) has been used in some installations to both increase the number of bits of data per second which may be transmitted over a fixed bandwidth as well as for improving the maximum signal-to-noise ratio for a given channel and bandwidth and spacing between microwave transmitter and receiver positions.

Diversity transmission and reception is commonly employed where signals are subject to multipath distortion. Such distortion occurs when the transmitted signal arrives at the receiving antenna by a plurality of paths and instead of directly from transmitting antenna to receiving antenna. Fading occurs when the signals arriving at the receiving antenna add out of phase with one another effectively cancelling one another. The amount of multipath distortion varies from time to time as atmospheric conditions change.

Diversity transmission and reception alleviate these problems to a large degree as signals of horizontal and vertical polarization are affected differently by different atmospheric conditions as well as by the different features on the terrain between two stations.

In such diversity systems, at the receiving station two antennas apart from one another are used although both may be mounted upon the same tower. Signals with horizontal polarization are received with one of the antennas while signals of vertical polarization are received with the other one of the antennas. At the transmitting station, the signals are transmitted with both polarizations. A clock signal may be transmitted along with the data in each channel. At the receiving end, a decision is made as to which of the horizontal or vertical received signals is the better and that signal selected as the output of the system.

In prior art systems, the switch from one data stream to the other was made without regard to the relative phase between data in the two data streams. The result was that frequently data was lost when switching from one data stream to the other. This made the overall system reliability much lower than it would be if switching could have been accomplished without the loss of the data. To compensate for the reduced reliability of the system, it was frequently the practice to either increase the transmitter power or decrease spacing between stations.

SUMMARY OF THE INVENTION

Accordingly, it is an object of the present invention to provide a communications system combining the advantages of discrete state molulation and diversity transmission and reception.

Furthermore, it is an object of the present invention to provide a communications system which takes maximum advantage of the available bandwidth with maximum permissible spacing between transmitting and receiving antennas.

Moreover, it is an object of the present invention to provide a microwave communications system of the diversity type wherein switching between received data streams is accomplished without loss of data.

These, as well as other objectives, are met with a microwave communications system which includes at least one transmitting antenna and two separated receiving antennas. The transmitting station transmits digitized information using discrete state modulation which in the preferred embodiment is QPSK modulation. At the receiving station there are at least two antennas, both of which may be mounted upon the same tower, and which are spaced ten to fifty wavelengths at the carrier frequency apart from one another. A separate receiver is coupled to each of these antennas. In the preferred embodiment, timing signals are recovered directly from the transmitted data by a phased lock loop which is locked with the fastest changes present in the transmitted data. The two receiver output data streams are coupled to a hitless switch. A decision is made as to which of the received data streams is of the highest quality and that data stream selected as the output from the receiving circuitry. The decision is made upon predetermined signal conditions including functionality of the receivers, bit error rate, signal level, and phase delay between or among data streams.

The selected data stream is then reformatted by conversion from serial to parallel and coupled to output utilization circuitry which may include computers, computer input/output devices, and other related equipment including digitized video and audio circuitry.

In other preferred embodiments, there are two transmitting and receiving antennas at each station, data being transmitted and received with both horizontal and vertical polarizations at both antennas at both stations. In such cases there will be both vertical and horizontal receivers and vertical and horizontal transmitters. One data stream may be transmitted vertically while the other is transmitted horizontally. Redundant transmitters, modulators, and multiplexing circuitry may be used to further increase the reliability of the overall communications system.

BRIEF DESCRIPTION OF THE DRAWINGS

FIG. 1 is a block diagram of one of the two systems shown in FIG. 1;

FIG. 8 is a table showing the method of QPSK encoding used in the transmitting circuitry of FIG. 2;

FIG. 9 is a table showing the QPSK decoding used in the receiving circuitry of FIG. 2;

FIG. 12 is a table showing the action to be taken by the hitless switch upon various receiver signal conditions.

DESCRIPTION OF THE PREFERRED EMBODIMENT

Figure 1:
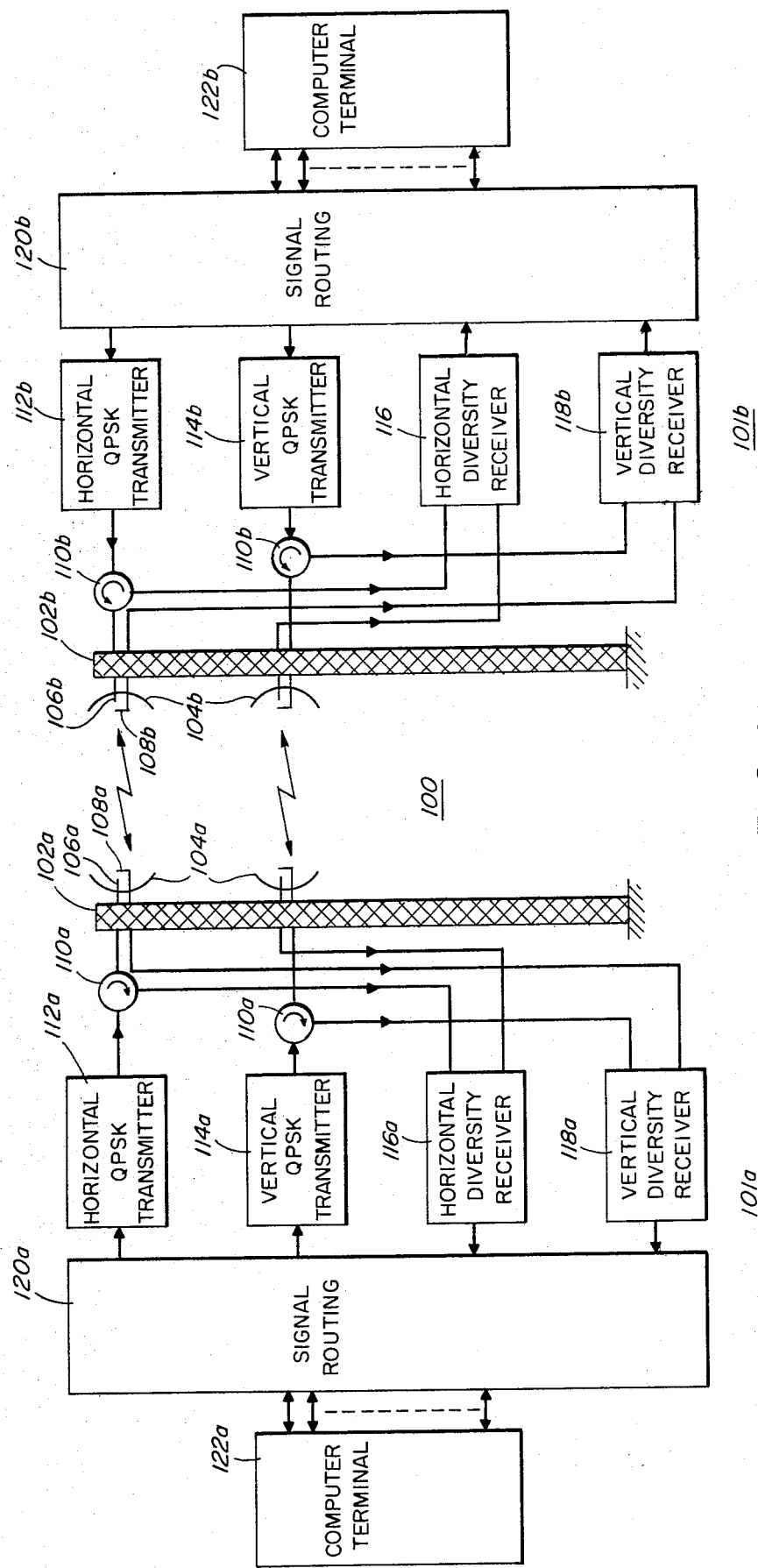
FIG. 1 is a diagram showing two microwave transmission and reception stations in accordance with the present invention.

Referring now in particular to FIG. 1, operation of a system embodying the present invention will be discussed. In this system, data is coupled in both directions between computer terminals 122a and 122b. When computer terminal 122a at transmitting and receiving station 101a is ready to send data to the computer terminal at station 101b, the output signals from computer terminal 122a are first coupled to signal routing circuitry 120a. In signal routing circuitry 120a these output signals from computer terminals 122a, which are in a parallel format for example one 16 bit word every microsecond, are converted to serial format at a rate equal to the number of bits coupled multiplied by their output frequency. In the illustrated embodiment, the serial data stream so produced is split into parts by signal routing circuitry 120a, half going to horizontal QPSK transmitter 112a and half going to vertical QPSK transmitter 114a. Hence if data is produced at a rate of 16 bits each microsecond by computer terminal 122a, a serial stream of data at a rate of 8 MHz will be coupled to each transmitter 112a and 114a.

QPSK transmitters 112a and 114a include both QPSK modulators as well as appropriate amplifiers. The preferred range of carrier frequency is in the frequency range of 7 to 8 GHz although other frequency ranges could be used as well. The present invention can be used as well in cable communications systems, and is especially useful for long cables such as would be used in overseas communications. The invention can apply as well for satellite communications although different frequencies would therein be used for the carrier signal. Any modulation technique wherein the modulated carrier signal has a plurality of distinquishable or discrete modulation states may be used.

The modulated outputs from QPSK transmitters 112a and 114a are coupled through circulators 110a to antennas 104a mounted upon microwave towers 102a. Each of antennas 104a includes horizontal elements 106a and vertical elements 108a. The output signal from horizontal QPSK transmitter 112a is transmitted with only a horizontal polarization while the output signal from vertical QPSK transmitted 114a is transmitted with only a vertical polarization. It has been determined that when these two signals are intercepted later at receiving antennas, that there will be at least 20 db of separation between the two signals. This separation is sufficient to prevent interference between horizontal and vertical signals at the output of the receivers.

Antennas 104a are preferably mounted upon the same tower separated by a spacing of 10 to 50 wavelengths of the carrier frequency. For the preferred frequency range of 7 to 8 GHz, a 40 foot spacing between antennas 104a has been found to be sufficient to provide the advantages of diversity reception systems.

Similar antennas 104b are provided at station 101b. Station 101b may be spaced at a distance from station 101a determined by the terrain separating the two. For flat terrain with no interfering features, distances in the range of 20 to 30 miles are preferred although larger distances may be used. Use of the present invention permits larger distances between stations for the same power levels than was previously possible.

Horizontal element 106b of upper antenna 104b is coupled through circulator 110b to horizontal diversity receiver 116b while horizontal element 106b of lower antenna 104b is coupled directly to the same receiver. Similarly, vertical element 108b of upper antenna 104b is coupled directly to vertical diversity receiver 118b while vertical element 108b of lower antenna 104b is coupled directly to vertical diversity receiver 118b. Diversity receivers 116 and 118 which contain identical circuitry, include circuitry to demodulate and decode each of the received QPSK modulated signals. That is, each diversity receiver 116 and 118 includes receiving circuitry for two separate signals. Furthermore, each diversity receiver 116 and 118 includes circuitry for choosing between the better of the two received signals.

The outputs from horizontal and vertical diversity receivers 116b and 118b, which are the preferred and selected signals, are coupled through signal routing circuitry 120b where they are converted to parallel format for coupling to computer terminal 122b. The portions of signal routing circuitry 120b which are coupled to horizontal and vertical diversity receivers 116b and 118b are the converse of that portion coupled to horizontal and vertical QPSK transmitters 112a and 114a, reconverting the received data to the same format as it was originally coupled from computer terminal 122a of station 101a.

Data transmission can be accomplished in both directions as station 101b contains the same transmitting circuitry as in station 101a. Horizontal and vertical QPSK transmitters 112b and 114b of station 101b are set to operate at a different frequency than corresponding transmitters 112a and 114a of station 101a. Hence, bidirectional communications are thereby established. Other lines may be coupled through signal routing circuitry 120a and 120b for video and voice equipment. In that case, it may be necessary to convert an analog signal to digital form before transmission.

A simple one-way communications system may be constructed still deriving advantage from the present invention. In that system, there is provided a single transmitter coupled to a single transmitting antenna. Data is QPSK modulated upon the carrier signal. At the receiving station, there are two antennas each of the same polarization as the transmitting antenna. One receiver is coupled to each antenna. A hitless switch operates in response to selection circuitry to couple the preferred one of the outputs of the two receivers to the utilization means. Various other configurations may be used depending upon the exact application required, the terrain involved between transmitting and receiving stations, and the bandwidth allocated.

When it is desired to communicate information beyond the practical limit of spacing for two stations, repeater stations may be provided between end stations, the repeater stations being spaced from one another at sufficiently close intervals to provide reliable communications. A repeater station may be provided using a system such as either one of 101a and b. In such a case, the output of the diversity receivers are coupled directly to the corresponding QPSK transmitters without passing through signal routing circuitry. Four antennas are then employed, two for receiving and two for transmitting. Of course, data may be tapped off and rerouted at any repeater station and an entire network with cross coupling between stations may also be constructed using the present invention.

Figure 2:
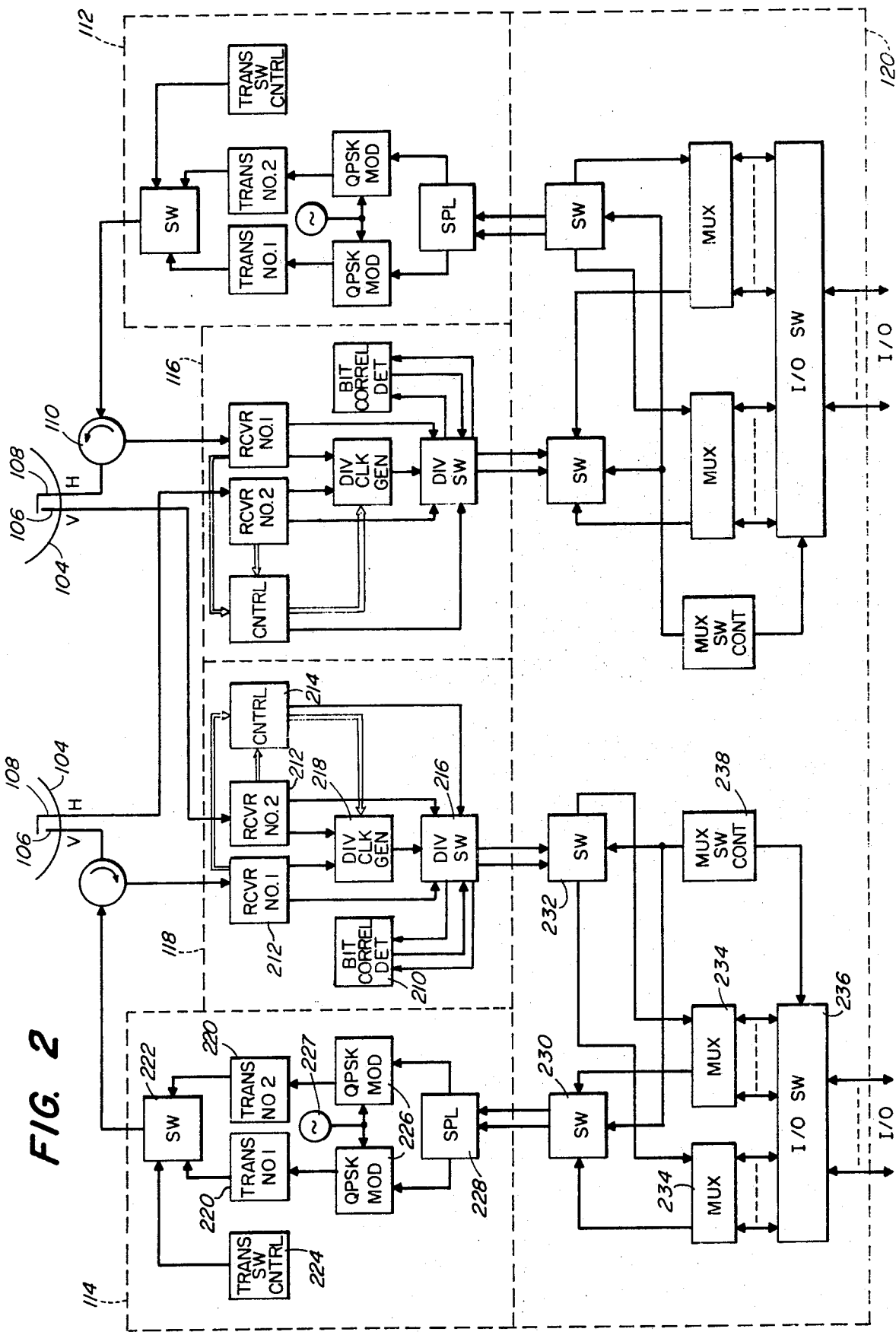

Referring now to FIG. 2 there is shown a block diagram of one of stations 101a and 101b of FIG. 1. Diversity receivers 116 and 118 each include two signal receivers 212, receiver No. 1 and receiver No. 2, one of which is coupled to each vertical element 106, of antennas 104, receiver No. 1 being coupled through isolator 110. Signal receivers No. 1 and No. 2 include amplifying and detecting circuitry as well as decoder circuitry and phased lock loop circuitry for deriving a local timing signal from the received data signals. The local timing signal from receivers No. 1 and 2 are each coupled to diversity clock generator 218. The data outputs from receivers No. 1 and No. 2 are coupled to diversity switch 216 and to bit correlation detector 210. Control circuit 214 senses the appropriate parameters in each receiver and operates diversity switch 216 by choosing the better of the two data outputs as the diversity receiver output. Bit correlation detector 210 senses when the received data streams are further apart from one another in time than one-half of a data bit time period and inhibits switching between data streams by diversity switch 216 should this limit be exceeded. Switching is inhibited since to do so would necessitate loss of at least one data bit.

Diversity clock generator 218 combines the local timing signals from receivers No. 1 and No. 2 and produces therefrom a composite timing signal whose edge transitions fall midway between the edge transitions of the two local timing signals. The operation of diversity clock generator 218 will be described in further detail in conjunction with FIGS. 3 and 4. The selected one of the receiver outputs is retimed within diversity switch 216 and coupled to routing switch 232.

Two sets of multiplexing controls are provided in the circuit shown in FIG. 2 to further increase the reliability of the total communications system. Of course, only a single one of such multiplexers need be provided to achieve an operable system. The data from diversity switch 216 is coupled to one of multiplexers 234 by routing switch 232 as selected by multiplexer switch control 238. Multiplexer switch control 238 may be operated by computer circuitry or manually as the system requires.

Multiplexers 234 convert the serial data coupled from switch 232 to parallel form. Preferably the same number of parallel bits are assembled as were produced at the output of computer terminal 122 as was shown in FIG. 1. The output of multiplexers 234 is coupled to input-/output switch 236 which couples the assembled data to the proper utilization device. Multiplexers 234 and input/output switch 236 are bi-directional with data flowing in the directions indicated by the arrows on the data lines. Multiplexers 234 are essentially bi-directional switches with appropriate data routing for assembly of the output data bits. In the preferred embodiment, multiplexers 234 are reed-type switches.

In the transmitting mode, data is coupled in through input/output switch 236 to the chosen one of multiplexers 234. The chosen multiplexer 234 converts the parallel input data to a serial stream of data as described in conjunction with FIG. 1. The data from the chosen one of multiplexers 234 is coupled through switch 230, splitter 228 and to modulators 226.

Modulators 226 QPSK modulate the I.F. signal produced by local oscillator 227 in the manner described below in conjunction with FIGS. 8 and 11.

In the preferred embodiment, redundant transmitters are provided to increase the overall reliability as was done by the provision of two multiplexer circuits. Each of transmitters 220 multiplies the modulated I.F. signal upwards to the desired transmitting frequency and amplifies that signal to the required power level. Transistor amplifiers are preferred for the preferred 7 to 8 gigahertz frequency range. Switch 222 is operated manually or under computer control by transmitter switch control 224. Switch 222 selects one of transmitters 220 coupling its output through directional coupler 110 to either vertical element 106 or horizontal element 108 of antennas 104.

Figure 7:
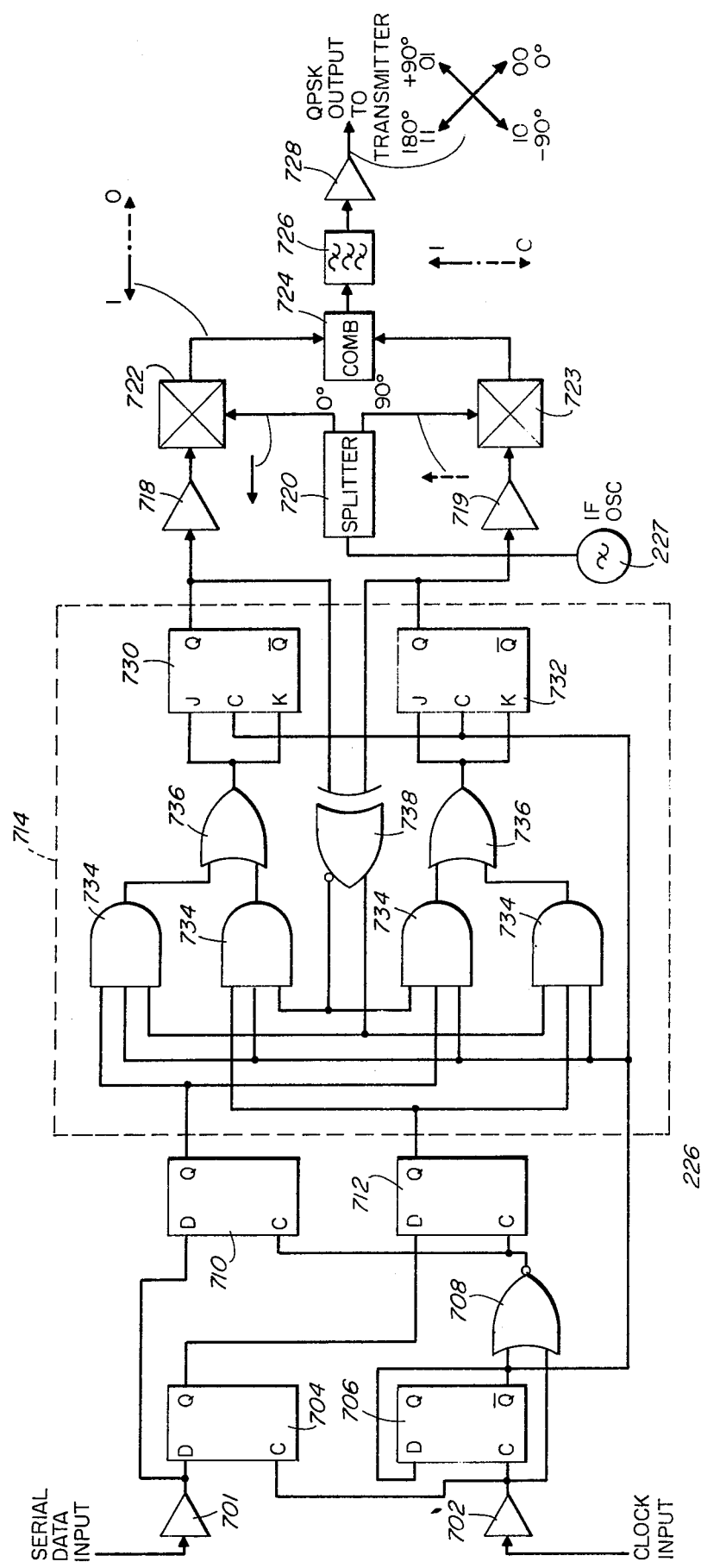
FIG. 7 is a schematic diagram of the QPSK modulator of FIG. 2.

Referring now to FIGS. 7, 8 and 10 the operation of modulators 226 of FIG. 2 will be explained. Referring in particular to FIG. 7, there is shown a schematic diagram of one of QPSK modulators 226. The serial input data stream is amplified by driver 701 while the input timing signal is amplified by driver 702. Flip-flop 706 is toggled by the amplified timing signal and produces a square wave on its Q output with a frequency of one-half that of the timing signal. The input data stream is coupled to the input of flip-flop 710 while the input stream delayed by flip-flop 704 is coupled to flip-flop 712. Flip-flop 704 produces a delay of one-half the period of the input timing signal. NOR gate 708, with one input coupled to the input timing signal and the other to the Q output of flip-flop 706 and the output to the clock inputs of flip-flops 710 and 712, produces as its output a pulsed signal with pulse width half the period of the input timing signal. Flip-flops 710 and 712 load the data on their inputs on the positive going edge of this pulse and transfer it to their outputs on the negative going edge. Since the timing signal rate to flip-flops 710 and 712 is one-half that of the input timing signal rate, the input data stream is divided equally between flip-flops 710 and 712, half going to each.

Encoder 714 performs the encoding function specified in the table shown in FIG. 8. The table indicates how the QPSK modulation function is to be performed. The new encoder output of two bits indicates which of the four possible phase conditions is to be impressed upon the output carrier. The present and previous encoder inputs are two sequential samples of the input data stream as assembled by flip-flop 710 and 712. The first bit of the present encoder input of the table is the output of flip-flop 710 while the second bit of the present encoder input is the output of flip-flop 712. Similarly, the first bit of the previous encoder input is the output of flip-flop 730 while the second bit of the previous encoder input is the output of flip-flop 732. The outputs present on the outputs of flip-flops 730 and 732 after data transfer through the flip-flops is that found in the table at the intersection of the present encoder input and previous encoder inputs. For example, if the previous encoder input were 11 and the present encoder input 01, the new encoder output will be 10.

The encoding function is performed by the matrix circuit of AND gates 734, OR gates 736, and exclusive OR gate 738 with both inverting and non-inverting outputs. Flip-flops 730 and 732 are of the J-K type which change output state when both J and K inputs, here coupled together, are both in the 1 state.

The outputs from encoder 714 are coupled through drivers 718 and 719 to phase shift modulators 722 and 723. I.F. oscillator 227, which in the preferred embodiment is a 70 MHz sine wave oscillator, is coupled through splitter 720 to phase modulators 722 and 723. The two outputs of splitter 720 are in quadrature with one another, one being 90° out of phase with the other.

When a 1 state output is applied from drivers 718 and 719 to one of the sets of inputs of phase shift modulators, 722 and 723, no additional phase shift is produced in the carrier signal by the modulators. When a logical 0 state is applied, the carrier is phase shifted by 180°. Hence, each modulator has two possible output states. Since the unmodulated carrier signals from phase shift modulator 723 are 90° out of phase with that from phase shift modulator 722 the combined output from combiner 724 has 4 possible states.

The modulated outputs from phase shift modulators 722 and 723 are additively combined by combiner 724. Filter 726 removes spurious signals and noise before the signals are further amplified by driver 728 before coupling to transmitters 220.

The vector diagrams accompanying FIG. 7 indicate the modulation operation of the system. The 0 and 90° outputs from splitter 720 are indicated by the vectors shown at the outputs of splitter 720. When a 0 is present at the inputs to phase shift modulators 722 and 723 the phase of the carrier signal is shifted 180° and consequently the vectors then point in the opposite direction. The combined outputs are shown at the output of driver 728 for each of the 4 possible input states. Of course, the actual overall orientation is arbitrary since there must be some reference signal with which phase measurements can be made. For example, as is shown in FIG. 10D, the 00 direction is arbitrarily assumed to be initially pointing to the left.

Figure 10A:
FIGS. 10A-10D are a series of waveforms illustrating the QPSK modulation technique.
Figure 10B:
Figure 10C:
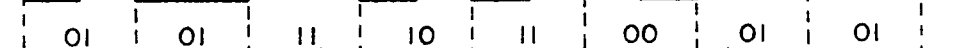
Figure 10D:
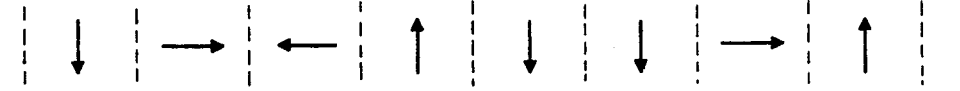

FIGS. 10A-10D illustrate with appropriate waveforms the operation of the QPSK modulator. FIG. 10A shows the input timing signal. FIG. 10B shows the serial data input as would be present on the input of flip-flop 704. The division into two bit segments by dotted lines shows the division into two data streams by flip-flops 710 and 712. The two-bit binary number shown in FIG. 10C represent the decoder output for each time period. It is assumed that the input data was previously all 0s at the start. For example, for the third marked off time period, the previous encoder input is 00 as in 10B, the present encoder input is 11 also as in FIG. 10B. The encoder output is then 11 as found in the table of FIG. 8 as the intersection of 00 as the previous encoder input and 11 as the present encoder input.

The vector diagram shown in FIG. 10C represents the phase of the modulator output to the transmitter 220. It is assumed arbitrarily that the operation is commenced with the vector pointing to the left. 01 indicates a change of +90° making the vector point downwards in the first marked off time period. In the second time period another +90° shift is performed. In the third time period 11 indicates a phase change of 180° making the vector reverse direction. In the fourth time period 10 indicates a phase change of −90° making the vectors point upwards. The process continues as long as data is present.

Referring again to FIG. 2 and further to FIGS. 3-6, the operation of the diversity receivers will be discussed in further detail. Each receiver 212 of FIG. 2 includes RF amplifying means, detecting means, and signal digitizing means. The received signal digitizer 650 and local timing signal generator 600 are shown in the schematic diagram of FIG. 6.

The signal from the antenna is amplified and detected by the "front end" portion of the receiver including therein an RF amplifier. The amplified signal is then mixed with a local I.F. signal and with the local I.F. signal shifted by 90°, the mixed signals are then brought to baseband to thus produce the I and Q signals shown in FIG. 6. The I and Q signals are sampled by sample flip-flops 610 clocked by the local timing signal from local timing signal generator 600.

The sampled signals are then coupled to differential decoders 614 which each perform the inverse function from the decoder circuitry shown in FIG. 7. Differential decoders 614 are logic circuits which decode the received signals to the same data format in which it was transmitted. The table for the operation of differential decoder 614 is specified by the table of FIG. 9.

Parallel to serial converter 616 merges the data outputs of differential decoders 614 to a single stream of data. Its output is coupled through flip-flop 632 through output driver 634 to the switching and multiplex circuitry as shown and described in conjunction with FIG. 2.

Figure 6:
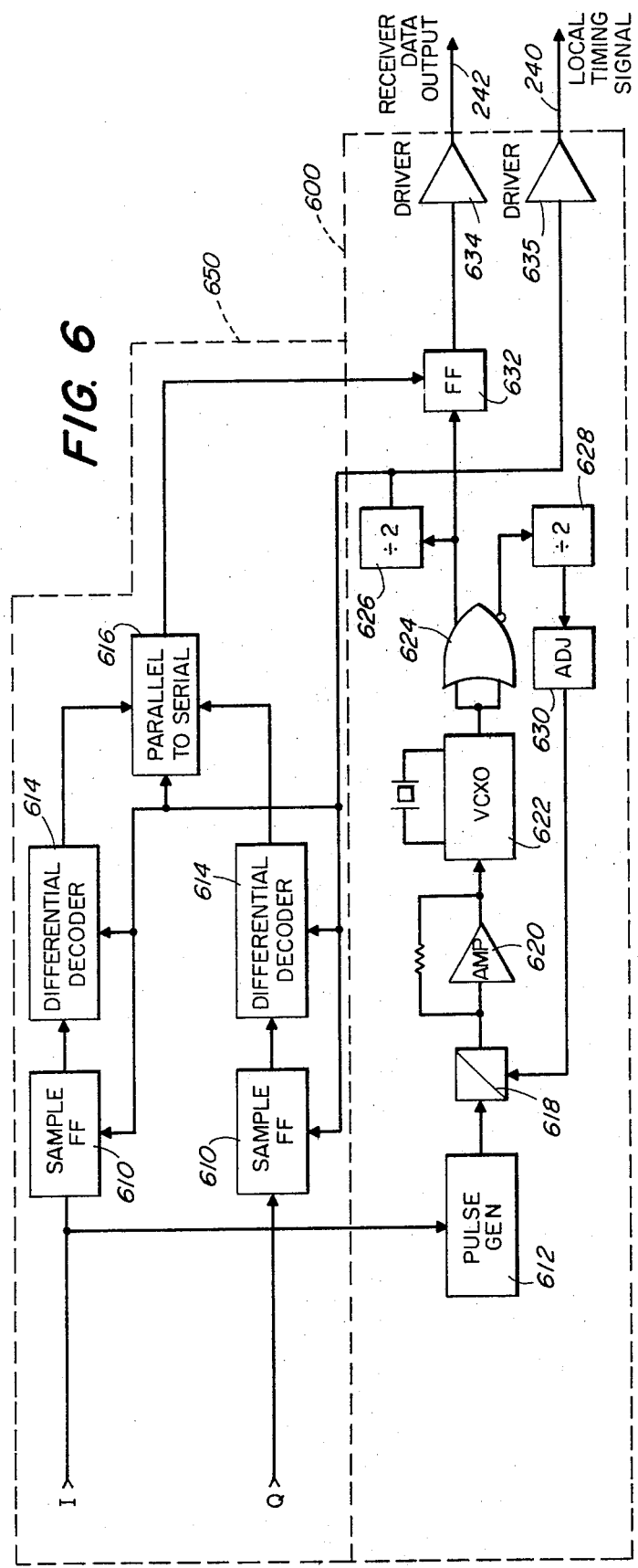
FIG. 6 is a schematic diagram of the timing signal recovery circuitry of the receiver shown in FIG. 2.

Local timing signal generator 600 circuitry is also shown in FIG. 6. Pulse generator 612 produces a pulse for each transition between 0 and 1, or 1 and 0 of the signal. These pulses are multiplied by the circuit output by mixer 618. Maximum output from mixer 618 is attained when the pulses from pulse generator 612 coincide in time with the pulses from the circuit output. The output of mixer 618 is amplified by amplifier 620 and coupled to the input of voltage controlled oscillator 622. Voltage controlled oscillator 622 includes a crystal controlled oscillator circuit operating at the expected value of the desired timing signal. The output of voltage controlled oscillator is coupled through OR gate 624 through its inverting input to flip-flop divide by 2 circuit 628 and phase adjustment circuit 630 back to mixer 618 forming a closed loop circuit which phase locks itself to the incoming pulses from pulse generator 612.

Phase adjustment circuit 630 is an adjustable delay circuit provided for adjustment of alignment between timing signals and data. If no pulses are received from pulse generator 612, such as during times when no data is being transmitted, the oscillator continues to free run and nevertheless produce pulses.

Flip-flop divide by 2 circuit 626 coupled to the noninverting output of OR gate 624 produces the local timing signal from the receiver. The local timing signal is amplified by driver 635 before being coupled to the other circuitry.

Figure 3:
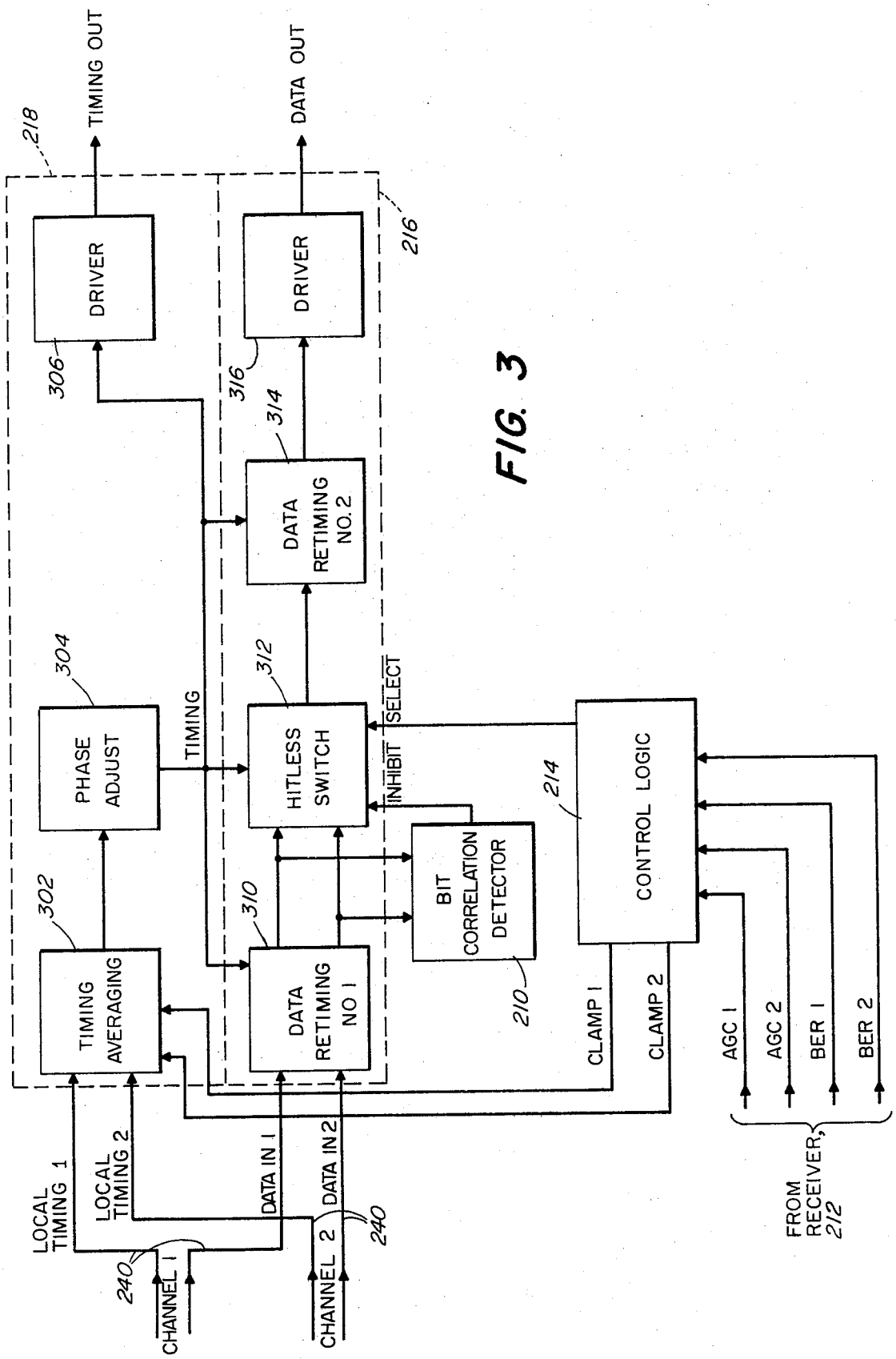
FIG. 3 is a block diagram showing the hitless switch, timing signal generation, and control circuitry of the block diagram of FIG. 2.

In FIG. 3 is shown a block diagram of diversity switch 216, composite timing generator 218, and associated bit correlation detector 210 and control logic 214. The local timing signals from both receivers 212 are coupled to timing averaging circuit 302. Timing averaging circuit 302 produces a composite timing signal whose edge transitions fall midway between those of the two local timing signals from the two receivers 212 on lines 240. Phase adjust circuit 304, which is a variable time delay circuit, is provided to adjust alignment between the composite timing signal and data. Driver circuit 306 provides further amplification for the clock signal for use in other portions of the circuitry.

Data from both receivers 212 on lines 242 is coupled to data retiming circuit No. 1 310 which reclocks the input data with the composite timing signal from composite timing generator 218. Its output is coupled to both bit correlation detector 210 and hitless switch 312. Hitless switch 312 selects one of the data signals from data retiming No. 1 310 and couples the selected one to data retiming No. 2 314. The selection of the better one of the two input signals is made under control of control logic 214 and bit correlation detector 210. The output of data retiming No. 2 314 is amplified by driver 316 before being coupled to utilization circuitry elsewhere in the system.

Figure 4:
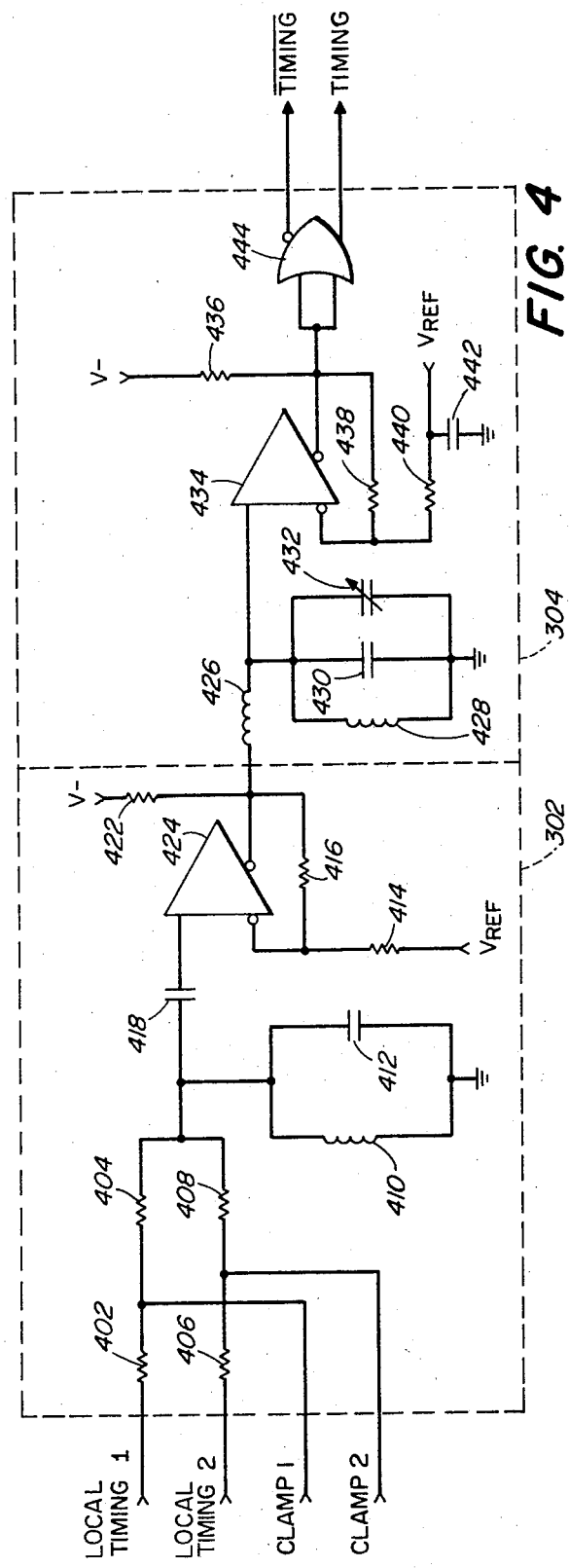
FIG. 4 is a schematic diagram of the timing signal generation circuitry of FIG. 3.
Figure 11A:
FIGS. 11A-E are a series of waveforms illustrating the operation of the timing signal generation circuitry of FIG. 4.
Figure 11B:
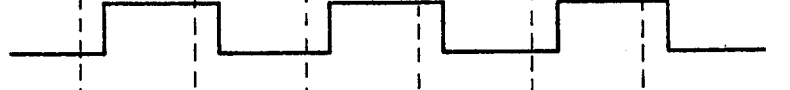
Figure 11C:
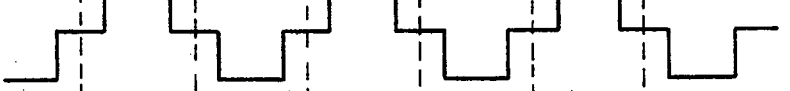

Referring now to FIG. 4, the operation of timing averaging circuit 302 and phase adjustment circuit 304 will be described in further detail. Reference should also be made to the timing waveforms shown in FIGS. 11A–11E. The signals in FIGS. 11A and 11B represent respectively the two local timing signals from receivers 212. The two signals are algebraically added with resistors 402, 404, 406, and 408. Should one of the input data signals be too noisy or too low in quality to be useful, clamping signals coupled to the junctions between the resistors are provided to disable the timing signal corresponding to the degraded data signal. The algebraically added timing signals are shown in FIG. 11C. This figure shows the added timing signals in absence of the resonant circuit compiled to the summation point.

Figure 11D:
Figure 11E:

The resonant circuit comprising inductor 410 and capacitor 412 is set to resonate at the same frequency as the timing signal frequency. When the summed signal waveform of FIG. 11C is applied across the resonant circuit, the waveform of FIG. 11D results. The waveform of FIG. 11D is essentially a sine wave wherein the voltage level halfway between peaks occurs at the average edge transition times of the timing signal waveforms of FIGS. 11A and 11B.

The remainder of timing averaging 302 comprises a Schmitt trigger circuit. The voltage from the resonant circuit is coupled to the noninverting input of amplifier 424 through capacitor 418. Bias voltage is supplied to the inverting output of amplifier 424 through resistor 422. $V_{REF}$ is the voltage reference which is set to be equal to the half-voltage points of the waveform of FIG. 11D. This voltage is coupled to the inverting input of amplifier 424 through resistor 414. The inverted output of amplifier 424 is coupled back to the noninverting input through resistor 416. When the input voltage coupled through capacitor 418 exceeds the $V_{REF}$, the inverting output of amplifier 424 assumes a voltage representing logical 0. When the voltage coupled through capacitor 418 falls below $V_{REF}$, the inverting output of amplifier 424 assumes a voltage representing logical 1.

The Schmitt trigger output is then coupled to phase adjustment circuitry 304. The output is coupled through inductor 426 and across a resonant circuit formed by inductor 428, fixed capacitor 430, and variable capacitor 432. Capacitor 432 is manually adjustable such that the phase of the output timing signal can be made to properly coincide with the proper edge transitions of the system processed data. The resonant circuit formed by inductor 428 and capacitors 430 and 432 is resonant near the primary frequency of the output of the Schmitt trigger circuitry, variable capacitor 432 making only slight changes in the shape of the waveform.

Amplifier 434 and the remaining portion of phase adjustment circuitry 304 form a second Schmitt trigger circuit used to shape the adjusted clock waveform prior to distribution. The operation of this Schmitt trigger circuit is the same as that in diversity clock generator 302. OR circuit 444 with both inverting and noninverting outputs provides additional signal waveform squaring and additional drive capability for the output timing signals.

Figure 5:
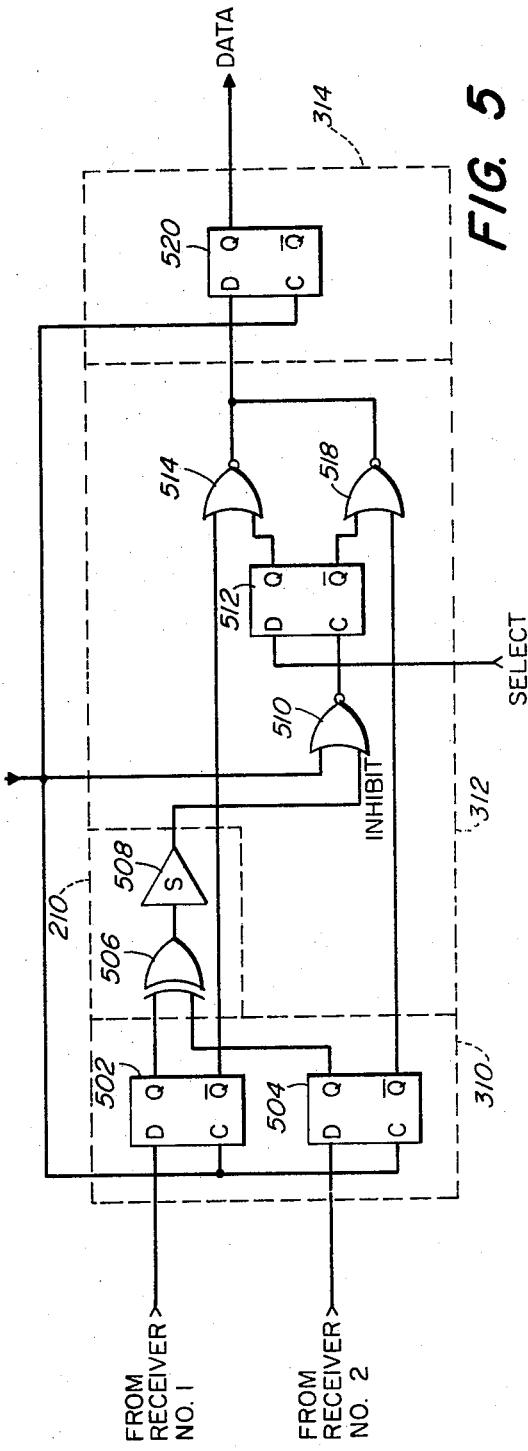
FIG. 5 is a schematic diagram of the hitless switch and data retiming portions of the block diagram of FIG. 3.

Referring now in particular to FIG. 5, there is shown a schematic diagram of data retiming circuits 310 and 314, bit correlation detector 210, and hitless switch 312. The two data inputs are coupled to the D inputs of flip-flops 502 and 504 which are clocked simultaneously by the inverted composite timing signal generated by the circuitry shown in FIG. 4. The Q output of flip-flop 502 is coupled to one input of NOR gate 514 while the inverted output of flip-flop 504 is coupled to one input of NOR gate 518. Selection of one of the two data inputs is made by the state of flip-flop 512 which in turn is set by the SELECT signal generated by control logic 214 shown in FIG. 3. If the SELECT line is in the 1 state, after a timing signal pulse, the Q output from flip-flop 512 will be in the 1 state and the Q output in the 0 stat. The data coupled from flip-flop 504 will pass through NOR gate 518 where it is reinverted then coupled to data retiming circuit No. 2 314 where it is retimed by flip-flop 520. Similarly, if the SELECT line is in the 0 state, after a timing pulse the Q output of flip-flop 512 will be in the 0 state and data will pass through NOR gate 514 to the input of flip-flop 520.

It should be noted that the timing signal to flip-flop 512 is inverted from that coupled to flip-flops 502, 504 and 520. Hence, flip-flop 512 can only change states halfway between transition times of flip-flops 502, 504 and 520. As data is clocked into any of these flip-flops only at the appropriate edge transition time, a change of state of flip-flop 512 will not interrupt the data flow. Thus it may be seen that the entire operation of this circuitry is "hitless". That is to say that the data flow is never interrupted when switching between input data signals. Since the timing is common for both data streams and since changes are made only at data transition times and never during the time that a bit is being utilized, the data stream is never interrupted and no data is lost upon switching.

Should the overlap time between data bits on the two input data lines 242 become greater than one-half bit time, it will be impossible to switch from one to the other without loss of data. Bit correlation detector circuit 210 provides an inhibit function for hitless switch 312 to prevent this occurrence. Exclusive OR gate 506 is coupled to each of the noninverted Q outputs of flip-flops 502 and 504. When the outputs from each of flip-flops 502 and 504 are identical, the output from exclusive OR gate 506 will be a 0. If they are not identical, the output from exclusive OR gate 506 will be a 1. Integrator 508 integrates the output of exclusive OR gate 506 over several bit time periods and produces a 1 on its output put if a 1 is present on the output of exclusive OR gate 506 during several adjacent or closely spaced bit time periods. A 1 coupled to the input of NOR gate 510 inhibits the timing signals from reaching the clock input of flip-flop 512 thereby preventing flip-flop 512 from changing states. Integrator 508 thus also prohibits switching back and forth rapidly between data streams. This prohibition is important in that occasionally a burst of noise may destroy the data in both channels for a short time. In that case switching between data streams provides no improvement in system operation.

The operation of control logic 214 is described by the table of FIG. 12. This table describes the logical process which takes place in control logic 214 to produce the SELECT signal to hitless switch 312. A 1 in the table indicates that the action to the right of the 1 listed under switch action will be instituted by control logic 214. An X in the table indicates that the fault condition to which it corresponds will have no further effect on the output of control logic 214 in view of already existing and overriding fault conditions. A dash in the table indicates that the fault condition to which it corresponds is not then present.

The selection of the data stream and hence output from control logic 214 is predicated upon four conditions as shown in the table. First, it is determined whether one of the two receivers is completely non-functional. In that case, only the operable receiver will be configured to the output data lines. In the remote case that both receivers have become completely non-functioning, the entire data output is inhibited.

Secondly, a measurement is made as of the BER (bit error rate). For performing the BER determination and producing a digital signal which changes logic states when the BER of a receiver exceeds a pre-set level, a Hewlett-Packard Company Bit Error Rate Measuring System consisting of a model No. 3760A Data Generator and Model No. 3761A Error Detector or the equivalent thereof may be used. In the case that the bit error rate of one of the receivers exceed $10^{-4}$, the receiver with the lower BER will be configured on line.

A second method of computing the BER is to transmit a known sequence of bits as a test message at predetermined periodic intervals. Comparison of the received sequence with the known sequence provides a measure of the BER.

Should both receivers be operable but the BER of both be greater than $10^{-4}$, the amplitude of the received signals at each receiver determines which receiver will be configured on line. However, should the delay difference between data bits in the two channels exceed one-half bit time, switching between data streams will be inhibited as described in conjunction with bit correlation detector circuit 210. The signal level at each receiver will also be determinative of which receiver is configured on line in absence of any other fault condition. If both of the received signals at the receivers are above a predetermined threshold level no switching between receivers will be accomplished although one signal may exceed the amplitude of the other.

Figure 13A:
FIGS. 13A-13E are a series of waveforms illustrating the operation of the hitless switch in switching between data streams.
Figure 13B:
Figure 13C:
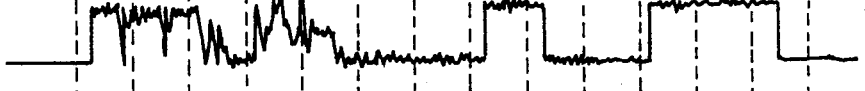
Figure 13D:
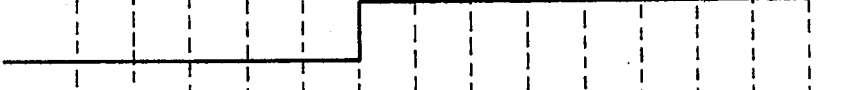
Figure 13E:
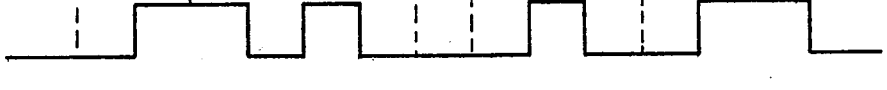

In FIGS. 13A–13E are shown a series of timing waveforms illustrating switching between data streams in the presence of noise. FIG. 13A shows the composite timing signal. FIGS. 13B and 13C show two supposed data streams carrying the same data but displaced slightly in time. FIG. 13D shows the SELECT signal generated by control logic 214. When the data stream shown in FIG. 13B is of better quality than the one shown in 13C that of 13B is retimed and used as the output. When the data stream of 13B becomes worse than that of 13C, the SELECT line changes state and the data stream of FIG. 13C is retimed and coupled to the output circuitry.

Although preferred embodiments of the invention have been described, numerous modifications and alterations thereto would be apparent to one skilled in the art without departing from the spirit and scope of the present invention.

We claim:

1. In combinaton:
   a plurality of diversity receiving means for receiving transmitted digital signals, each of said transmitted signals comprising a local timing signal, each of said transmitted signals being received by a separate one of said receiving means;
   means for producing a composite timing signal from the received local timing signals; and
   means for coupling a selected one of said diversity receiving means to utilizing means, selection of the said selected one of said receiving means occurring without loss of data to said utilizing means, said selection occurring in synchronism with a composite timing signal, transitions of said composite timing signal occurring at the average of the transition times of local timing signals at each of said receiving means.

2. The combination of claim 1 wherein said coupling means comprises switch means coupled to outputs of said receiving means.

3. The combination of claim 2 wherein said switch means operates in response to control means coupled to said receiving means.

4. The combination of claim 3 wherein said control means operates in response to a signal level in each of said receiving means.

5. The combination of claim 4 wherein said control means further operates in response to the bit error rate in each of said receiving means.

6. The combination of claim 5 wherein said switch means is inhibited from coupling inoperative receiving means to said utilizing means.

7. In combination:
   a plurality of means for receiving signals, said signals being modulated with digital data, each of said receiving means having an output for said digital data;
   means coupled to each of said receiving means for generating a local timing signal from said digital data;
   means for producing a composite timing signal from said local timing signals, said composite timing signals having edge transitions substantially at the average time of the edge transitions of said local timing signals; and
   means for coupling a selected one of said outputs of said receiving means to utilizing means, data to said utilizing means being in synchronism with said composite timing signal.

8. The combination of claim 7 wherein said receiving means comprises two or more antennas spacially separated from one another.

9. The combination of claim 8 wherein said coupling means operates in response to one or more signal characteristics in said receiving means.

10. The combination of claim 9 wherein said signal characteristics comprise automatic gain control voltage and bit error rate.

11. The combination of claim 10 wherein said coupling means comprises electronic switch means.

12. A diversity receiver comprising in combination:
   a plurality of means for receiving digitally modulated microwave signals;
   means for producing a local timing signal for each of said receiving means;
   means for coupling a selected one of said receiving means to utilizing means in accordance with preselected signal characteristics in said receiving means;
   means for producing a composite timing signal from said local timing signals, said composite timing signals having transitions substantially at the average time of transitions of said local timing signals; and
   means for synchronizing data to said utilizing means with said composite timing signal.

13. In combination:
   a plurality of diversity receiving means; and
   switch means coupled to outputs of said diversity receiving means for coupling a selected one of said diversity receiving means to utilizing means, selection of said selected one of said receiving means occurring without loss of data to said utilizing means, said switch means operating in response to control means coupled to said receiving means, said control means operating in response to a signal level in each of said receiving means and to the bit error rate in each of said receiving means.

14. The combination of claim 13 wherein said switch means is inhibited from coupling inoperative receiving means to said utilizing means.

15. In combination:
   two or more antennas, said antennas being spatially separated from one another;
   a plurality of means for receiving signals coupled to said antenna means, said signals being modulated with digital data, each of said receiving means having an output for said digital data;
   means coupled to each of said receiving means for generating a local timing signal from said digital data;
   means for producing a composite timing signal from said local timing signals; and
   means for coupling a selected one of said outputs of said receiving means to utilizing means, data to said utilizing means being in synchronism with said composite timing signal, said coupling means operating in response to an automatic gain control voltage and bit error rate in said receiving means.

16. In combination:
   two or more antenna means, said antenna means being separated from one another;
   a plurality of means for receiving signals coupled to said antenna means, said signals being modulated with digital data, each of said receiving means having an output for said digital data;
   means coupled to each of said receiving means for generating a local timing signal from said digital data;
   means for producing a composite timing signal from said local timing signals, said composite timing signal having edge transitions at the average time of edge transitions of said local timing signals; and
   means for coupling a selected one of said outputs of said receiving means to utilizing means, data to said utilizing means being in synchronism with said composite timing signal.

17. The combination of claim 16 wherein said coupling means comprises electronic switch means.

* * * * *